(12) United States Patent
Winkelmeyr

(10) Patent No.: US 11,011,961 B2
(45) Date of Patent: May 18, 2021

(54) SYSTEM FOR COOLING AN ELECTRIC MACHINE

(71) Applicant: AUDI AG, Ingolstadt (DE)

(72) Inventor: Felix Winkelmeyr, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 142 days.

(21) Appl. No.: 16/377,614

(22) Filed: Apr. 8, 2019

(65) Prior Publication Data

US 2019/0341831 A1    Nov. 7, 2019

(30) Foreign Application Priority Data

May 7, 2018   (DE) .......................... 102018207004.0

(51) Int. Cl.
    *H02K 9/19*     (2006.01)
    *H02K 9/197*     (2006.01)

(52) U.S. Cl.
    CPC .................................. *H02K 9/197* (2013.01)

(58) Field of Classification Search
    CPC .............................. H02K 9/197; H02K 11/25
    See application file for complete search history.

(56) References Cited

U.S. PATENT DOCUMENTS

| | | | |
|---|---|---|---|
| 2008/0185925 A1 | 8/2008 | Kurple | |
| 2013/0234543 A1 | 9/2013 | Buttner et al. | |
| 2014/0339932 A1* | 11/2014 | Hossain | H02K 9/19 310/53 |
| 2015/0035391 A1 | 2/2015 | Fuchs et al. | |
| 2017/0155353 A1* | 6/2017 | Lee | H02P 29/66 |

FOREIGN PATENT DOCUMENTS

| | | |
|---|---|---|
| CN | 1421065 A | 5/2003 |
| CN | 101240735 A | 8/2008 |
| CN | 103312089 A | 9/2013 |
| CN | 104348303 A | 2/2015 |
| DE | 102008007414 A1 | 8/2008 |
| DE | 102008054216 A1 | 5/2010 |
| DE | 102014110778 A1 | 2/2015 |
| DE | 102014213103 A1 | 1/2016 |
| DE | 112014002445 T5 | 2/2016 |
| DE | 102015214053 A1 | 1/2017 |
| JP | 2002233107 A | 8/2002 |
| WO | 01/78215 A1 | 10/2001 |

OTHER PUBLICATIONS

German Examination Report dated Sep. 20, 2018 in corresponding German Application No. 102018207004.0; 20 pages.
Office Action dated Sep. 30, 2020 in corresponding Chinese Application No. 201910366123.X; 13 pages including English-language translation.

\* cited by examiner

*Primary Examiner* — Naishadh N Desai
(74) *Attorney, Agent, or Firm* — Maier & Maier, PLLC

(57) ABSTRACT

A system for cooling an electric machine, including as components a stator and a rotor, wherein each component has a cooling circuit, the system including at least one regulator for regulating a volume flow of a coolant from a coolant reservoir and a control unit, wherein in each case an input of each cooling circuit is connected to at least one regulator for regulating the volume flow of the coolant from the coolant reservoir, wherein the control unit is adapted to set at least one regulator for regulating the volume flow of the coolant into the cooling circuit of a respective component, while taking into account at least one temperature of the respective component.

8 Claims, 1 Drawing Sheet

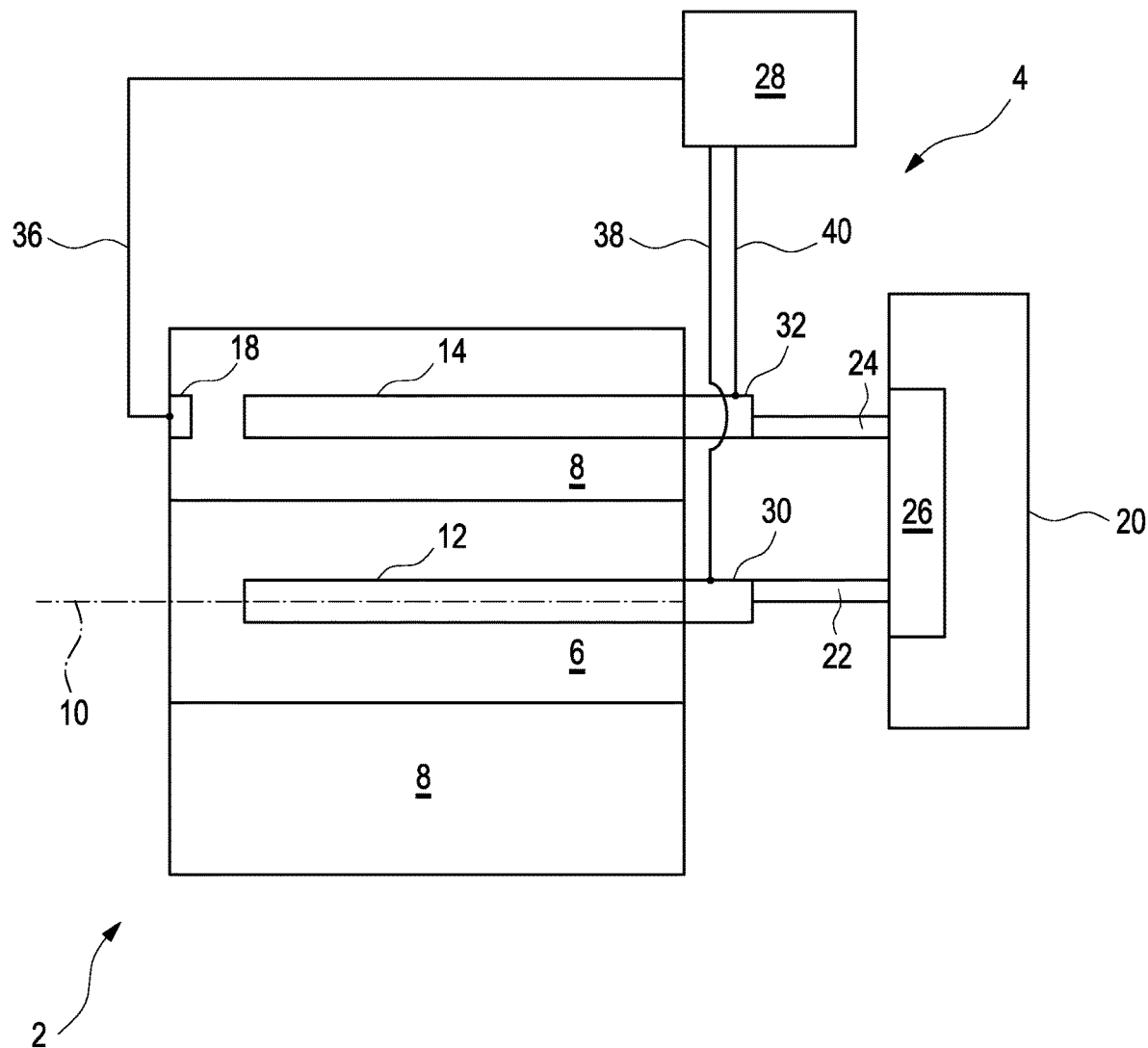

SYSTEM FOR COOLING AN ELECTRIC MACHINE

FIELD

The disclosure relates to a system for cooling an electric machine, an electric machine, and a method for cooling an electric machine.

BACKGROUND

An electric machine is cooled, e.g., by water as a coolant. It is possible for the cooling of a rotor of the electric machine and the cooling of the stator of the electric machine to be connected in series.

Publication DE 10 2008 007 414 A1 describes a method for controlling the temperature of an alternator and a vehicle engine.

A device for supplying a coolant to a stator and a rotor of an electric motor in a vehicle is known from the publication DE 10 2014 110 778 A1.

An electric drive unit for an electric vehicle is known from the publication DE 10 2015 214 053 A1. Here, the electric drive unit comprises an electric motor, which comprises an engine-cooling system.

Against this background, an object of the invention was to effectively cool an electric machine.

This object is achieved by a system, an electric machine, and a method having the features of the independent claims.

SUMMARY

The system according to the invention is designed for cooling an electric machine, which as components has a stator and a rotor, and wherein each component has a cooling circuit. The system has at least one regulator for regulating a volume flow of a coolant from a coolant reservoir, and a control unit. One input of each cooling circuit is connected to at least one regulator for regulating the volume flow of the coolant from the coolant reservoir. The control unit is adapted to set at least one regulator for regulating the volume flow of the coolant into the cooling circuit of a particular component taking into account the temperature of that component.

The system includes a thermometer or temperature sensor associated with the stator and is designed to measure a temperature of the stator.

The control unit is designed to detect and/or determine a temperature of the rotor usually taking into account a temperature model for the rotor. Such a temperature model is placed or stored in the control unit. It is also possible to store the usually complex temperature model in a control device of the electric machine, whereby the control device is arranged, e.g., in a pulse inverter or the power electronics of the electric machine. It is possible for the control unit to be designed as part of this control unit, or at least be in communicative connection with the control unit to be able to retrieve the present temperature of the rotor based on the temperature model.

In one embodiment, a regulator for regulating the volume flow of the coolant from the coolant reservoir in the respective cooling circuit is arranged at an input of the respective cooling circuit of each of the two components, whereby the respective cooling circuit or its end is connected to the coolant reservoir via the relevant regulator, and optionally via at least one line for conveying coolant. The control unit is adapted to set the regulator for regulating the volume flow of the coolant into the cooling circuit of a particular component, taking into account the temperature measured by the stator thermometer and the rotor temperature determined by the temperature model.

In one possible embodiment, the system has several regulators for regulating the volume flow of a coolant from the coolant reservoir and several thermometers. A cooling circuit of each component is connected to the coolant reservoir via a regulator. Each component, i.e., both the stator and the rotor, is assigned at least one thermometer for measuring a temperature. The control unit is designed to set at least one regulator for regulating the volume flow of the coolant into the cooling circuit of a particular component taking into account the temperature measured by at least one thermometer for that component. Alternatively, it is also possible with the control unit, as mentioned above, to determine the temperature of the rotor by means of a temperature model specified for the rotor. Optionally, the temperature of the stator may be determined with a temperature model having been stored for the stator.

At least one regulator for regulating the volume flow of the coolant is designed, e.g., as a valve. Thus, it is possible to adjust and/or regulate the volume flow of the coolant flowing into the respective cooling circuit of a component by opening and closing the valve. It is possible here either to close a respective valve either completely, whereby the volume flow of the coolant into the respective cooling circuit is interrupted, or open it and allow or enable the coolant to be conveyed from the coolant reservoir into the cooling circuit of the relevant component. Thus, it is possible in an embodiment to vary an opening cross-section of the opened valve. Here, the opening cross-section of the closed valve is zero. A maximum possible opening cross-section can be set for the opened valve. Thus, it is possible to vary the size of the opening cross-section gradually or continuously between a minimum possible value equal to zero and the maximum possible value of the size or area of the opening cross-section. This makes it possible to vary and thus control the volume flow of the coolant, e.g. water, which flows from the coolant reservoir into the respective cooling circuit. The regulators at the respective cooling circuits distribute the whole volume flow of the coolant drawn from the coolant reservoir to the respective cooling circuits of the respective components depending on the position of the respective regulators.

If, alternatively, the system only has one regulator, e.g., a regulator designed as a valve, then both cooling circuits are connected to the coolant reservoir via this specific regulator. This specific regulator is designed to distribute an original volume flow of the coolant, which is conveyed from the coolant reservoir to the regulator, to the cooling circuits of the two components proportionally, as a percentage and/or quantitatively. Depending on the temperature of at least one component, it is possible for the regulator of one of the two components to provide a minimum of 0% to a maximum of 100% of the volume flow, and for the other of the two components to provide a corresponding remainder of the volume flow.

Moreover, it is possible that at least one regulator for regulating the volume flow of the coolant is arranged, e.g., installed in a vehicle drive.

In one embodiment, at least one thermometer is arranged in an electrical axis for driving the vehicle. This electrical axis comprises the drive of the vehicle or components thereof, i.e., the electric machine, a transmission, and a pulse inverter. The stator axially surrounds the rotor, with the thermometer arranged in and/or on the stator. The temperature of the rotor is usually determined by the complex temperature model of the rotor.

The method according to the disclosure is intended for cooling an electric machine, which as components has a stator and a rotor, whereby each component has a cooling circuit. One input of each cooling circuit is connected to at least one regulator for regulating the volume flow of the coolant from the coolant reservoir. At least one regulator for regulating the volume flow of the coolant into the cooling circuit of a respective component is set, taking into account a temperature of the respective component.

At least one regulator for regulating the volume flow of the coolant into the cooling circuit of at least one of the components or the respective component is set, taking into account a temperature of at least one of the components, preferably both components.

Usually, the temperature of the rotor is determined by a temperature model. The temperature of the stator is determined by a temperature sensor or a thermometer.

In one embodiment of the method, a volume flow of the coolant that is greater than for the other components is set for the component, whose temperature is higher than the temperature of the other components. Here, a ratio of the volume flow proportions of the coolant for the respective cooling circuits can be determined/calculated based on a temperature difference or a temperature ratio of the respective temperatures of the respective components via an algorithm, as can a respective proportion for the respective cooling circuits based on a total volume flow from the coolant reservoir.

An embodiment of the method provides for cooling the electric machine, such that each input of each cooling circuit will be or is connected via a respective regulator to the coolant reservoir, whereby a regulator for regulating the volume flow of coolant from the coolant reservoir will be is or installed, e.g., at the input of each cooling circuit. In one embodiment of the method, the respective regulator for regulating the volume flow of the coolant into the cooling circuit of a respective component is controlled and/or regulated and, furthermore, set by the control unit taking into account the temperature of at least the respective component measured by at least one thermometer or determined by means of a temperature model.

It is possible that the volume flow for the rotor is set depending on the temperature of the rotor, and usually depending on the temperature of the stator. Accordingly, it is possible that the volume flow for the stator is set depending on the temperature of the stator and usually depending on the temperature of the rotor. It is also possible that the respective temperatures of the stator and the rotor, as components of the electric machine, are compared with one another. Furthermore, it is possible that a temperature of at least one of the two said components of the electric machine is compared with a temperature of at least one component of the vehicle drive and/or the coolant described above.

With the temperature model for the rotor temperature, the temperature is determined as dependent on at least one, generally measurable, operating parameters of the electric machine and/or the motor-vehicle drive. In this case, the operating parameters taken into account are a rotational speed of the rotor, the temperature of the stator, and/or an electrical operating variable of the electric machine, e.g., a current flowing through the electric machine, or a voltage applied to the electric machine. Moreover, it is possible to take into account as operating parameters the rate or coolant flow volume up to at least one regulator between the coolant reservoir and the cooling circuits, the temperature of the coolant, and a present operating point of the electric machine. It is also possible to determine the temperature of the stator using an appropriate temperature model.

In an embodiment, the components are cooled synchronously or in parallel. Here, the volume flow of the coolant for at least one component, e.g., both components is set, e.g., divided, depending on the temperature of at least one of the components, which is measured and/or determined via a respective temperature model.

In this method, the amount of coolant and thus the volume flow of coolant flowing or streaming into the cooling circuit of the respective component is regulated for each component, i.e., the stator and the rotor, by opening or closing the respective regulator, which is designed, e.g., as a valve, whereby the respective volume flow may also be varied quantitatively and thus regulated by regulating an area or size of the cross-sectional area of the respective valve. Such regulation can be performed by the control unit.

The electric machine according to the invention has as components a stator and a rotor. Furthermore, the electric machine according to the invention has an embodiment of the proposed system according to the invention.

The system allows for suitably cooling each component of the electric machine depending on the operating state of the electric machine. When cooling a particular component, in addition to the currently measured temperature or the temperature of this component determined by a temperature model designed for this component, the currently measured temperature or the temperature of the other of the two components determined by a temperature model designed for the other component is usually also taken into account.

The electric machine is arranged, e.g., in a vehicle. In the proposed embodiment of the system according to the invention, it is possible that a vehicle designed, e.g., as a motor vehicle, in particular an automobile, has at least one such electric machine, which is designed to convert electrical energy from an electrical energy store of the vehicle into mechanical energy, with which the vehicle is driven and/or moved. In this case, the electric machine is operated as a motor. Alternatively, it is possible to operate the electric machine as a generator as part of so-called recuperation, and to reconvert the mechanical energy of the vehicle into electrical energy. An embodiment of the presented method can be implemented regardless of whether the electric machine is operated as a motor or a generator. The motor vehicle, which is equipped with at least one such electric machine for driving, is designed and/or designated as an electric vehicle or hybrid vehicle.

It is possible to cool the electric machine intelligently with an embodiment of the proposed inventive system, as well as with an embodiment of the proposed method.

Thus, a certain rate or volume of flow may be set for the rotor and stator, as a whole. Since some operating states of the electric motor and/or driving states of the motor vehicle place more stress on the stator or some more on the rotor, the volume flow of the coolant may always be increased at the relevant critical or more heavily stressed component. This will more vigorously cool a component, for which this makes sense. Thus, the components are not rigidly cooled, e.g., with a 50/50 distribution of the flow of coolant.

In an embodiment of the method, both components of the electric machine, i.e., their cooling circuits, are usually supplied with liquid coolant, e.g., water or cooling water, from the coolant supply or a corresponding coolant reservoir. Both cooling circuits are connected in parallel to the coolant reservoir, wherein at least one regulator, e.g. a regulator for each cooling circuit, or a regulator shared by both cooling circuits, is connected upstream of at least one cooling circuit in order to control the volume flow. Depending on at least one measured or determined temperature for at least one component, it is possible to optionally close or open each regulator individually for each cooling circuit of each component, and thus control a volume flow of coolant for a respective cooling circuit and to divide a total volume flow of coolant from the common coolant reservoir, as required, depending on the temperature and/or depending on a temperature distribution in the electric machine When controlling the volume flow, at least the present temperature of the respective component must be taken into account, and the regulator assigned thereto must be closed or opened accordingly, whereby a degree of opening is variable. If, furthermore, distribution of the temperature in the electric machine is taken into account, whereby it is possible that the stator and the rotor have different temperatures or the same temperature, at any given time, the present temperature of the rotor can also be taken into account in addition to the present temperature of the stator in order to control the volume flow of the coolant for cooling the stator. Accordingly, it is possible to consider the present temperature of the stator, as well as the present temperature of the rotor in order to control the volume flow of coolant for the rotor. In one embodiment, the cooling circuit of the component having a higher temperature than the other[s], is supplied with more coolant. Thus, it is possible to set a suitable temperature, e.g., a preset temperature, e.g., the same temperature, for the components through suitable cooling.

The method and the system make possible parallel cooling of the two components or components of the electric machine and thus of the stator and rotor. Distributing the volume flow of the coolant is intelligently controlled with the control unit via a valve or a similar component as a regulator. The temperature of one component or element is varied by regulating the volume flow with a relevant regulator, whereby optimal distribution of the temperature in the electric machine is achieved. This can increase the permanent performance of the electric machine, installed, e.g., in a vehicle. In addition, reproducibility of the performance is achievable.

In order to implement parallel cooling of the stator and the rotor, it is provided that a valve or similar device be installed as a regulator at the input of a respective cooling circuit. The temperatures of the rotor and stator are determined via existing thermometers, as sensors, in an electrical axis and/or the temperature model stored in the control unit. With the newly installed valves in a drive, a distribution of the volume flow of the coolant is varied, which optimizes cooling of the electric machine.

In a possible embodiment of the method, a temperature model is used and/or taken into account in order to determine the temperature of a particular component.

It is understood that the aforesaid features and those to be explained below can be used not only in the specified combination, but also in other combinations or separately, without departing from the scope of the present invention.

BRIEF DESCRIPTION OF THE FIGURES

The disclosure is schematically illustrated by embodiments in the drawing and will be described schematically and in detail with reference to the drawing.

FIG. 1 shows a schematic representation of an embodiment of the electric machine according to the invention and an embodiment of the system according to the disclosure, when implementing an embodiment of the method according to the invention.

DETAILED DESCRIPTION

FIG. 1 shows a schematic representation of the embodiment of the electric machine 2 according to the invention, which is arranged here in a vehicle, and which the embodiment of the system 4 according to the invention is directed to. The electric machine 2 has as components a rotor 6 and a stator 8, which are arranged here coaxially to an axis 10 of the electric machine 2. In this case, the stator 8 surrounds the rotor 6 coaxially. During operation of the electric machine 2, it is provided that the rotor 6, as a component within the stator 8, rotates relative to the stator 8 about the axis 10, whereby, depending on the operating state of the electric machine 2, electrical energy is converted into mechanical energy when the electric machine 2 is operated as a motor, or whereby mechanical energy is converted into electrical energy, when the electric machine 2 is operated as a generator.

Furthermore, it is provided that the rotor 6 has a cooling circuit 12 and that the stator 8 has a cooling circuit 14. Furthermore, the stator 8 has a thermometer 18, whereby a temperature of the stator 8 is measured with this thermometer 18. A temperature of the rotor 6 is determined by a control unit 28 via a temperature model for rotor 6.

The temperature model describes a dependence of the temperature of rotor 6 upon at least one operating parameter of the electric machine 2, e.g., the (present) temperature of the stator 8, a (present) speed of the rotor 6, a (present) cooling water temperature, a (present) cooling water flow and/or an electrical (present) operating variable of the electric machine 2, e.g., a current flowing through windings of electromagnets of the stator 8, or a voltage applied to the windings. Moreover, it is possible that the temperature is dependent on the mechanical and/or electrical power of the electric machine 2. The temperature model is stored here in the control unit 28.

Depending on their definition, both cooling circuits 12, 14 and the thermometer 18 are designed as components of the electric machine 2 and/or as components of the system 4, whereby it is possible that the electric machine 2 has cooling circuits 12, 14, as well as thermometer 18, independently of system 4 as well as the embodiment of the method.

In addition, FIG. 1 shows a coolant reservoir 20, in which a usually liquid coolant, such as, e.g., water, is stored. Here, the coolant reservoir 20 is connected to the coolant circuit 12 of rotor 6 via a first coolant line 22, and to the coolant circuit 14 of stator 8 via a second coolant line 24. Furthermore, the coolant reservoir 20 here has a pump, which is designed to convey coolant, e.g., water, from the coolant reservoir 20 through the coolant lines 22, 24 to the cooling circuits 12, 14. The coolant supply 20 and the coolant lines 22, 24 may be designed as components of the system 4. It is also possible for the coolant supply 20 and the coolant lines 22, 24 of the electric machine 2 to also be provided independently of the system 4 and the embodiment of the method.

Alternatively, the coolant can also be conveyed via a line to the electric machine 2, whereby this line is divided into two lines. The flow rate or flow ratio of the coolant for the stator 8 and the rotor 6 in electric machine 2 is varied by a regulator, e.g., a valve, depending on the temperature of the components.

The embodiment of system 4, as a component, has the control unit 28, which is also designed or may be designated as a control unit and/or regulation unit, as well as a first regulator 30 and a second regulator 32. Here, the first regulator 30 is designed, e.g., as a valve and arranged at an input of the cooling circuit 12 of rotor 6 between this cooling circuit 12 and the coolant reservoir 20, e.g., in or on the coolant line 22. Accordingly, the second regulator 32 is also designed here, e.g., as a valve, and is arranged at an input of the cooling circuit 14 of stator 8, or between the stator 8 cooling circuit 14 and the coolant reservoir 20, i.e., in or on coolant line 24, for example.

In the embodiment of the method with system 4, the temperature of the stator 8 is measured by the thermometer. This measured temperature or a value of this temperature is transmitted via a signal to the control unit 28 via an electrical line 36 and evaluated. The temperature of the rotor 6 is determined by means of the control unit 28 with the temperature model depending on at least one operating parameter of the electric machine 2.

Depending upon the temperature measured or determined for each component, the control unit 28 determines which volume flow of coolant is required for a particular component Taking this into account, a regulator 30, 32 designed here as a valve is actuated based on control unit 28, whereby a signal is provided to the respective regulator 30, 32 via an electrical line 38, 40, whereby the regulator 30, 32 is closed, or if necessary, gradually opened. For the rotor 6, an area of an opening cross-section or a passage opening of the regulator 30 is set depending on the temperature of rotor 6 and usually also of stator 8, whereby the volume flow from the coolant reservoir 20 into the cooling circuit 12 of the rotor 6 is regulated. Depending on the temperature of stator 8 and usually also of rotor 6, the area of the opening cross-section or the passage opening of regulator 32 is set accordingly, whereby the volume flow of coolant from the coolant reservoir 20 to the cooling circuit 14 of stator 8 is also regulated. Accordingly, the temperature of stator 8 is usually taken into account, when regulating the area of the passage opening of regulator 30 at the inlet of cooling circuit 12 of rotor 6, and the temperature of rotor 6 is also taken into account, when regulating the area of the passage opening of regulator 32 at the inlet of cooling circuit 14 of stator 8.

The invention claimed is:

1. A system for cooling an electric machine, comprising:
   as components a stator and a rotor, wherein each component has a cooling circuit, the system further comprising a regulator for regulating a volume flow of a coolant from a coolant reservoir and a control unit,
   wherein an input of each cooling circuit is connected to the regulator,
   wherein the control unit is adapted to set the regulator to proportionately divide the coolant between the cooling circuits of the stator and the rotor, so that a portion of the coolant is flowed through the cooling circuit of the stator and a remainder of the coolant is flowed through the cooling circuit of the rotor,
   wherein the coolant is divided according to a temperature of the stator and a temperature of the rotor so that the component with a higher temperature receives a higher proportion of the coolant,
   wherein the control unit is adapted to determine the temperature of the rotor according to a temperature model, the temperature model utilizing at least a flow rate of the coolant as a parameter.

2. The system according to claim 1, comprising a thermometer associated with the stator and adapted to detect a temperature of the stator.

3. The system according to claim 1, wherein the regulator is designed as a valve in order to regulate the volume flow of the coolant.

4. A method of cooling an electric machine comprising:
   as components a stator and a rotor, wherein each component has a cooling circuit, wherein one input of each cooling circuit is connected with a regulator for regulating a volume flow of a coolant from a coolant reservoir,
   wherein the regulator is set to proportionately divide the coolant between the cooling circuits of the stator and the rotor, so that a portion of the coolant is flowed through the cooling circuit of the stator and a remainder of the coolant is flowed through the cooling circuit of the rotor,
   wherein the coolant is divided according to a temperature of the stator and a temperature of the rotor so that the component with a higher temperature receives a higher proportion of the coolant,
   wherein the control unit is adapted to determine the temperature of the rotor according to a temperature model, the temperature model utilizing at least a flow rate of the coolant as a parameter.

5. The method according to claim 4, wherein the temperature of the stator is determined with a thermometer.

6. The system according to claim 2, wherein the regulator is designed as a valve in order to regulate the volume flow of the coolant.

7. The system according to claim 1, wherein the control unit is further adapted to determine the temperature of the stator according to the temperature model.

8. The method according to claim 4, wherein the control unit is further adapted to determine the temperature of the stator according to the temperature model.

* * * * *